United States Patent
Fan et al.

(10) Patent No.: US 7,034,223 B2
(45) Date of Patent: Apr. 25, 2006

(54) MOUNTING APPARATUS FOR PCB

(75) Inventors: Chen-Lu Fan, Tu-cheng (TW); Li-Ping Chen, Tu-cheng (TW)

(73) Assignee: Hon Hai Precision Industry Co., Ltd., (TW)

( * ) Notice: Subject to any disclaimer, the term of this patent is extended or adjusted under 35 U.S.C. 154(b) by 73 days.

(21) Appl. No.: 10/953,706

(22) Filed: Sep. 29, 2004

(65) Prior Publication Data

US 2005/0201070 A1 Sep. 15, 2005

(30) Foreign Application Priority Data

Mar. 11, 2004 (CN) .................. 2004 2 0043631

(51) Int. Cl.
*H05K 5/02* (2006.01)
(52) U.S. Cl. .................. 174/51; 174/52.1; 174/138 G; 361/753
(58) Field of Classification Search .................. 174/51, 174/52.1, 138 G; 361/753, 742, 758
See application file for complete search history.

(56) References Cited

U.S. PATENT DOCUMENTS

| | | | |
|---|---|---|---|
| 5,414,223 A * | 5/1995 | Suski et al. .................. 174/262 |
| 6,560,119 B1 * | 5/2003 | Katsuyama et al. ........ 361/752 |
| 6,621,002 B1 * | 9/2003 | Ennis et al. ........... 174/35 GC |
| 6,751,102 B1 * | 6/2004 | Chen .......................... 361/758 |
| 6,760,231 B1 * | 7/2004 | Hung et al. ................. 361/758 |
| 6,813,161 B1 * | 11/2004 | Le et al. ..................... 361/758 |
| 6,864,433 B1 * | 3/2005 | Fetzer et al. ............ 174/138 G |
| 6,906,266 B1 * | 6/2005 | Verrigni .................. 174/138 G |
| 2006/0005992 A1 * | 1/2006 | Pav et al. ............... 174/138 G |

* cited by examiner

*Primary Examiner*—Hung V. Ngo
(74) *Attorney, Agent, or Firm*—Morris Manning & Martin; Tim Tingkang Xia, Esq.

(57) ABSTRACT

A PCB mounting apparatus includes a supporting plate (20) defining a number of through holes, a number of standoffs (50) engaging in the through holes, and a number of grounding members (60) attached to the standoffs. The standoff each includes a head (52) having a holding portion, a flange (54), a post (56), and a base (58). The grounding member each includes a first ring (62) supported on the flange, a second ring (68) supported on the base, and a band (66) connecting therebetween. The PCB (80) defines a number of fixing apertures (82). The combined standoff and grounding member is disposed in the through hole. The PCB is placed upon the supporting plate with the fixing apertures engaging the holding portions of the standoffs and contacts the first rings of the grounding members. The standoffs and the grounding members are made of conductive materials.

19 Claims, 5 Drawing Sheets

US 7,034,223 B2

MOUNTING APPARATUS FOR PCB

BACKGROUND OF THE INVENTION

1. Field of the Invention

The present invention relates to mounting apparatuses for securing a Printed Circuit Board (PCB) in an electronic device, and more particularly to an apparatus which can quickly and readily mounting PCB therein and detaching therefrom.

2. Description of the Related Art

During assembly of a typical personal computer, a PCB such as a motherboard must be fastened to a computer frame or chassis. The motherboard is conventionally mounted to the computer chassis using fasteners such as screws or bolts. China Pat. Nos. 98241276.2 and 00201452.1 each discloses such an arrangement. Coinciding positioning holes are defined respectively in the motherboard and the chassis. The fasteners are inserted and fixed into the coinciding positioning holes, and thereby the motherboard and the chassis are tightened and secured together.

When installing or removing the motherboard, tightening or removing the fasteners is laborious and time-consuming. In addition, a tool such as a screwdriver or a wrench is usually required. Moreover, the motherboard is prone to be damaged if the tool slips during manipulation.

Thus, a mounting apparatus for a PCB which solves the above-mentioned problems is strongly desired.

SUMMARY OF THE INVENTION

Accordingly, an object of the present invention is to provide a mounting apparatus which allows quickly and readily attachment and removal of a PCB to and from a chassis of an electronic device.

To achieve the above-mentioned object, a mounting apparatus in accordance with the preferred embodiment of the present invention is used to mount a PCB in a chassis of an electronic device. The mounting apparatus comprises a supporting plate defining a number of through hole, a number of standoff engaging in the through hole, and a number of grounding member attached to the standoff. The standoff and the grounding member are made of conductive materials. The standoff includes a head having a holding portion, a flange, a post, and a base. The grounding member includes a first ring supported on the flange, a second ring supported on the base, and a band connecting the first and second rings. The PCB defines a number of fixing apertures. The combined standoff and grounding member is disposed in the through hole. The PCB is placed upon the supporting plate with the fixing aperture engaging the holding portion of the standoff. The PCB contacting the first ring, the supporting plate contacting the second ring, and the base contacting the chassis are forming a grounding circuit.

Other objects, advantages and novel features of the present invention will be drawn from the following detailed description of a preferred embodiment of the present invention with attached drawings, in which:

DETAILED DESCRIPTION OF THE INVENTION

Figure 1:
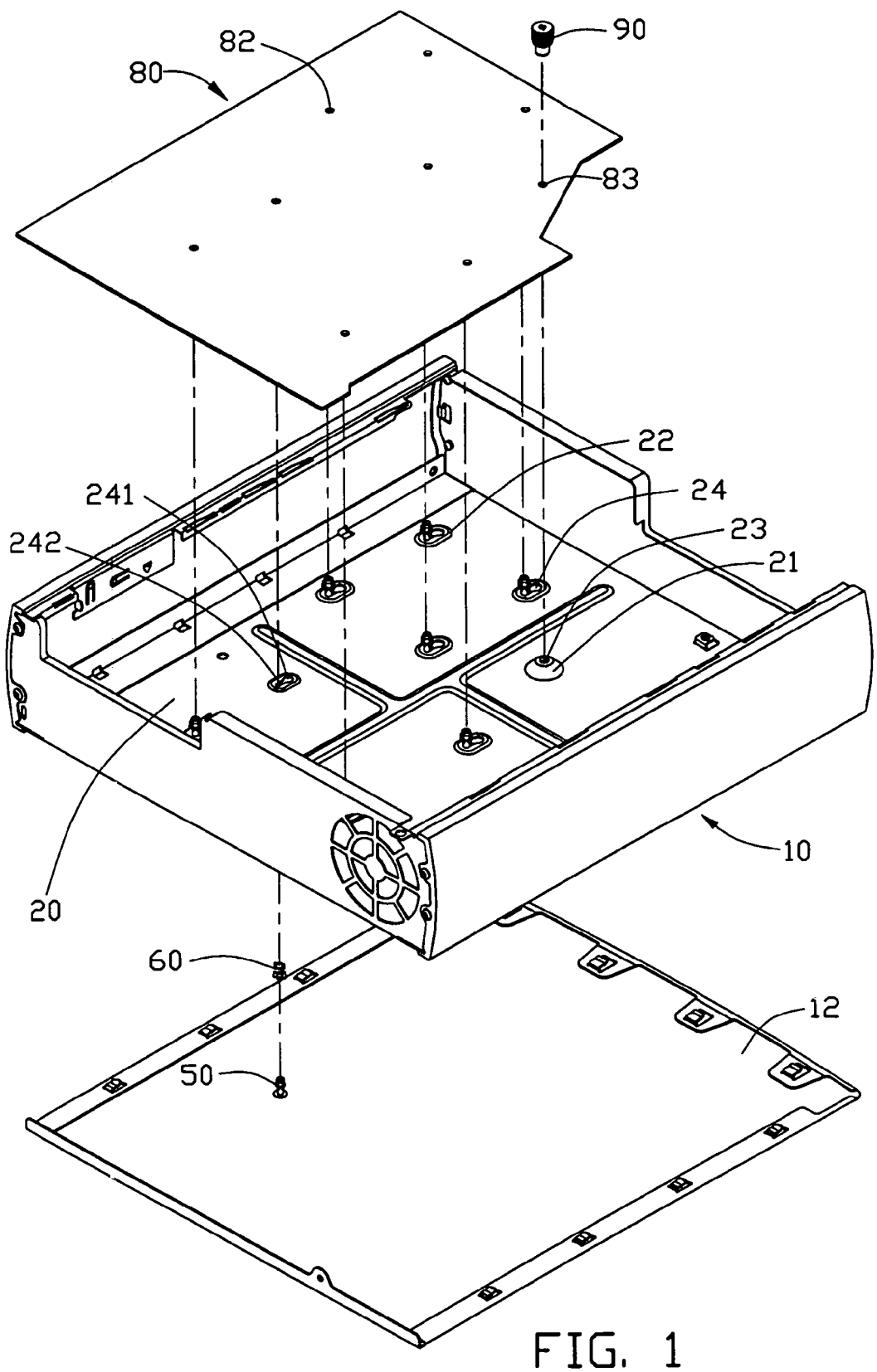
FIG. 1 is an exploded, isometric view of a mounting apparatus in accordance with the present invention, together with a PCB, the mounting apparatus comprising a supporting plate, and a plurality of standoffs and grounding members.

Referring to FIG. 1, a mounting apparatus in accordance with the preferred embodiment of the present invention is used for securing a PCB 80 in an electronic chassis 10. The PCB 80 defines a plurality of fixing apertures 82 and a through aperture 83 therein. The chassis 10 comprises a bottom panel 12. The mounting apparatus comprises a supporting plate 20, a plurality of standoffs 50, a plurality of grounding members 60, and a thumb screw 90.

The supporting plate 20 is disposed in the chassis 10, for supporting the PCB 80 thereon. The supporting plate 20 comprises a bulge 21 and a plurality of raised platforms 22. A screw hole 23 is defined in the bulge 21, corresponding to the through aperture 83 to engage with the thumb screw 90. A through hole 24 is defined in each raised platform 22. The through hole 24 comprises a circular hole 241, and a slot 242 extending from the circle hole 241.

Figure 2:
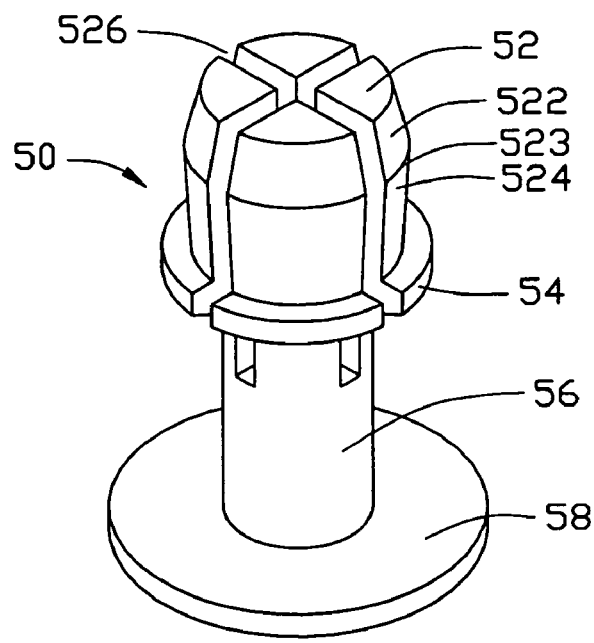
FIG. 2 is an enlarged, isometric view of the standoff of FIG. 1.

Referring also to FIG. 2, each standoff 50 is made of conductive material. The standoff 50 comprises a circular base 58, a post 56 extending perpendicularly from an upper surface of the base 58, a head 52 formed at the top of the post 56, and an annular flange 54 disposed around a lower end of the head 52. Two crossing slots 526 interpenetrate the head 52, the flange 54 and a part of the post 56. The head 52 comprising a diameter increasing guiding portion 522, a diameter reduced retaining portion 524, and a convex portion 523 formed therebetween. A height of the holding portion 524 is slightly larger than a thickness of the PCB 80. A diameter of the convex portion 523 is slightly larger than that of the fixing aperture 82 of the PCB 80. A diameter of the base 58 is larger than that of the circle hole 522 and is smaller than a width of the slot 524 of each through hole 52 of the supporting plate 20.

Figure 3:
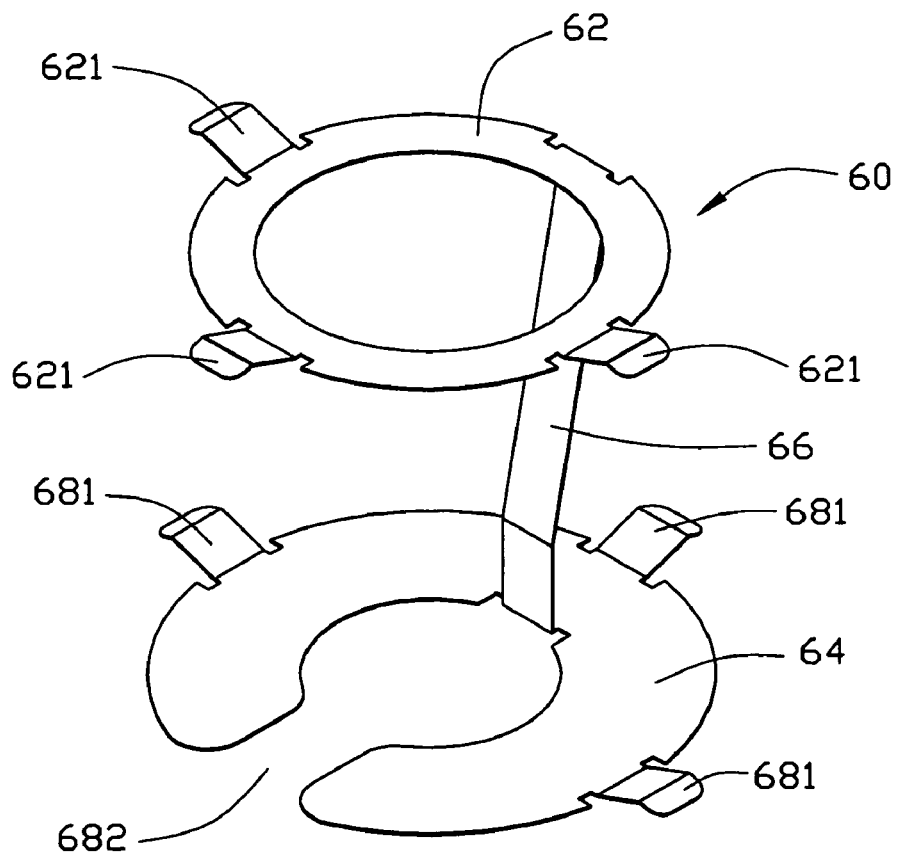
FIG. 3 is an enlarged, isometric view of the grounding member of FIG. 1.

Referring also to FIG. 3, each ground member 60 is also made of electrically conductive material. The ground member 60 comprises a first annular ring 62 and a second annular ring 64 with a band 66 being disposed therebetween. A plurality of first resilient strips 621 extends outwardly and slantways from an outer peripheral edge of the first ring 62. A plurality of second resilient strips 681 extends outwardly and slantways from an outer peripheral edge of the second ring 68. The band 66 extends from the outer peripheral edge of the first ring 62 to an inner peripheral edge of the second ring 68. A notch 682 is defined in the second ring 68 opposing to the band 66, for the post 56 of the standoff 50 entering therefrom.

Figure 4:
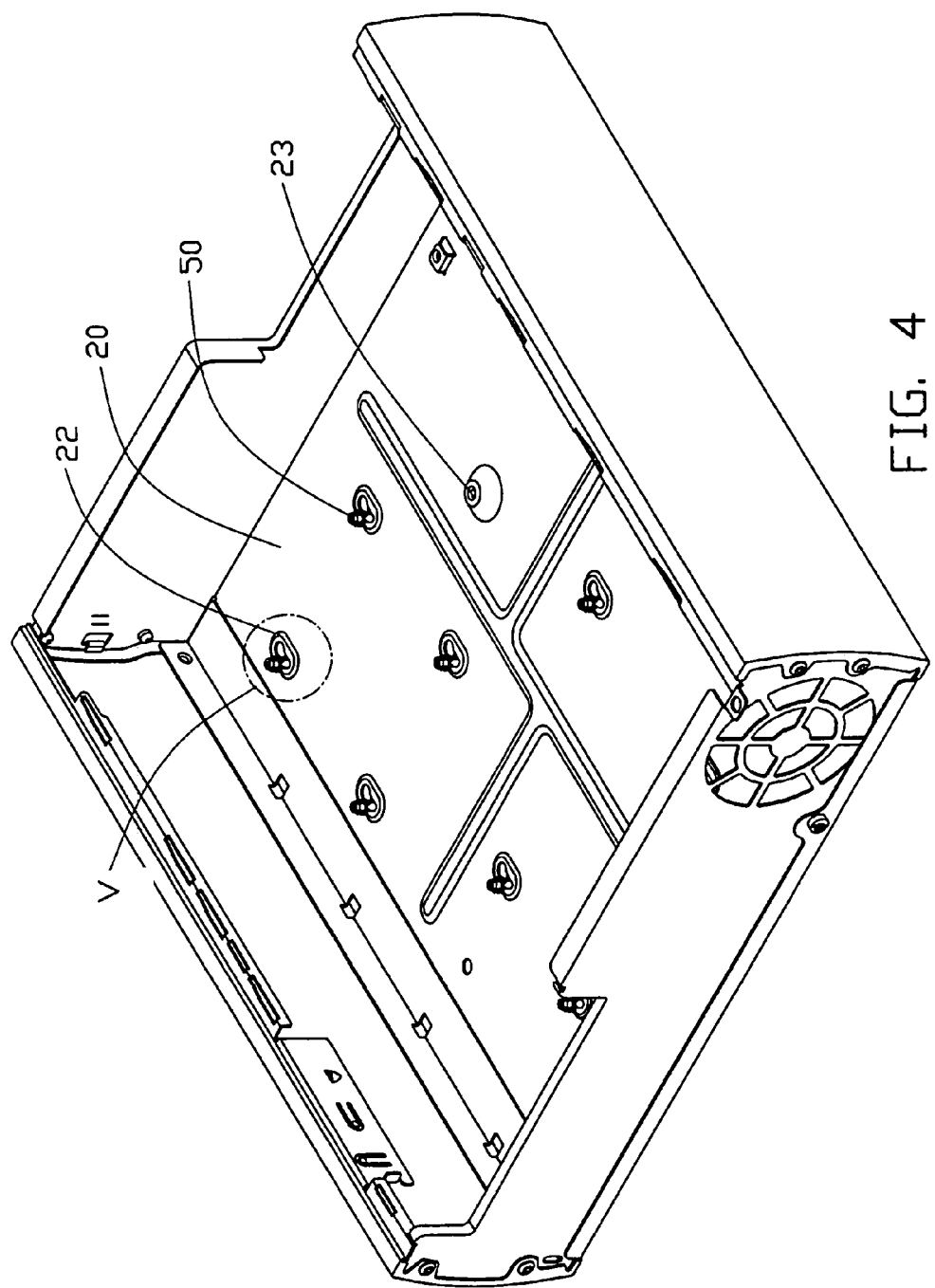
FIG. 4 is a partially assembled view of the standoff, the grounding member, and the supporting plate of FIG. 1.
Figure 5:
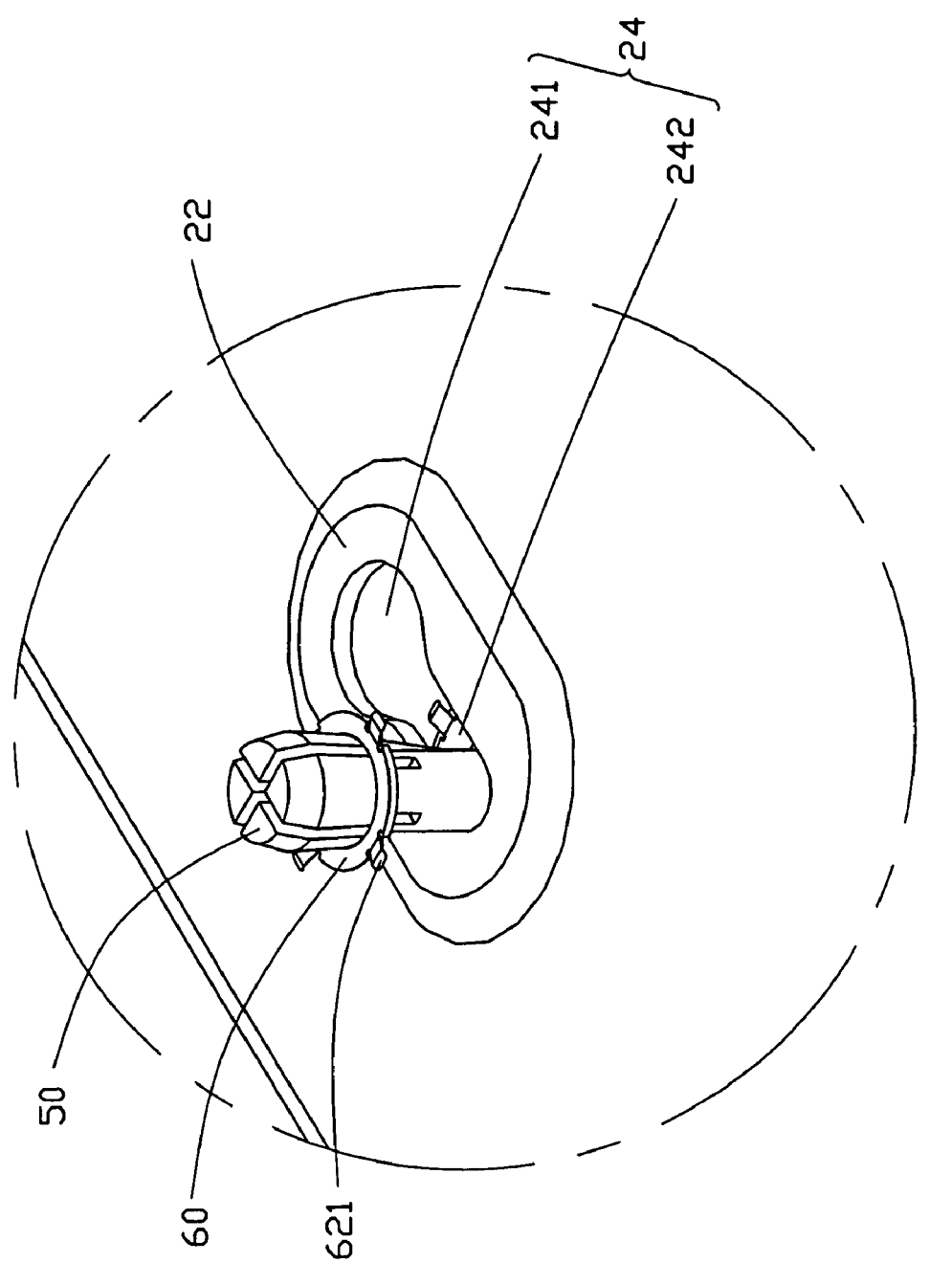
FIG. 5 is an enlarged view of an circled part V of the to FIG. 4.
Figure 6:
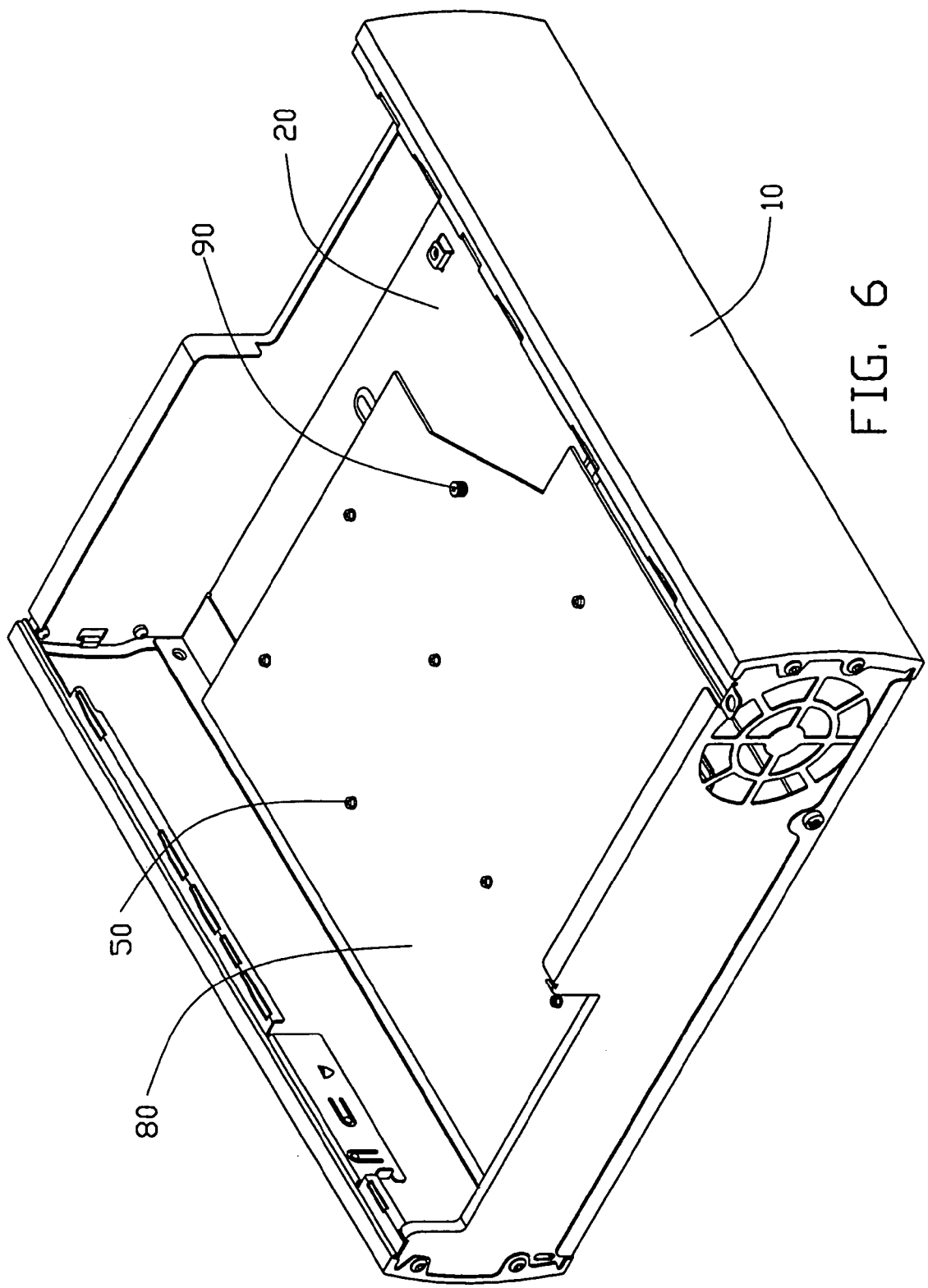
FIG. 6 is a complete assembled view of FIG. 1.

Referring also to FIG. 4, in assembly of the mounting device for PCB, the first ring 62 of the ground member 60 is placed around the head 52 and supported on the flange 54 of the standoff 50. The second ring 64 is placed around the post 56 via the notch 682 and supported on an upper surface of the base 58. The band 66 contacts outer surfaces of the flange 54 and the post 56 of the standoff 50. The assembled standoff 50 and ground member 60 are upwardly inserted into the circular hole 241 of the through hole 24 of the supporting plate 20. The bottom panel 12 is attached to the chassis 10 and the base 58 of the standoff 50 is supported on the bottom panel 12. The post 56 is received in the circle hole 522. The base 58 and the second rings 64 are sandwiched between the supporting plate 20 and the bottom panel 12 of the chassis 10. The PCB 80 is placed onto the supporting plate 20, with the fixing apertures 82 respectively aligning with the standoffs 50. When a downward force is applied on the PCB 80, the head 52 of each standoff 50 is squeezed. The PCB 80 moves downwardly along the guiding portion 522. The PCB 80 first rides over the convex portions 523 of the standoffs 50 and finally supported on the flanges 54. The fixing apertures 82 engage with the holding portions 524 of the standoff 50 so that the PCB 80 is secured onto the standoffs 50. The PCB 80 is drawn to move the post 56 of each standoff 50 from the circle hole 241 to the slot 242 of the corresponding through hole 24 of the supporting plate 20. The screw hole 23 of the support plate 20 is in alignment with the through aperture 83. The thumb screw 90 is then extended into the through aperture 83 and engage in the screw hole 23 to fasten the PCB 80 in the chassis 10. The first strip 621 and the second strip 681 of the ground member 60 correspondingly contact the PCB 80 and the supporting plate 20. The standoff 50 together with the ground member 60 contacts the PCB 80 and the supporting member 20 to form a grounding circuit within the chassis 10 to discharge electrostatics of the electronic device.

In disassembly, the thumb screw 90 is unscrewed first. The PCB 80 is drawn to move the post 56 of each standoff 50 from the slot 242 to the circle hole 241 of the corresponding through hole 24 of the supporting plate 20. The head 52 of the standoff 50 is squeezed to disengage from the fixing apertures 82 of the PCB 80. Thus the PCB 80 is easily detached from the supporting plate 20.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting apparatus for securing a Printed Circuit Board (PCB) in a chassis, the PCB defining a plurality of fixing apertures, the chassis comprising a panel, the mounting apparatus comprising:
   a supporting plate secured to the chassis and above the panel, the supporting plate defining a plurality of through holes therein; and
   a plurality of standoffs received in the through holes of the supporting plate, each of the standoffs comprising a head, a base, and a post disposed therebetween;
   wherein the post of each of the standoffs is slidably received in a corresponding through hole of the supporting plate, and the base is supported on the panel of the chassis, the PCB is secured in the chassis with the fixing apertures engaging with the heads of the standoffs and supported on the flange.

2. The mounting apparatus as described in claim 1, further comprises a ground member attached to the standoff, the ground member comprises a first ring, a second ring, and a band disposed therebetween, the first and the second rings separately located on the flange and the base of the standoff.

3. The mounting apparatus as described in claim 2, wherein the first and second rings respectively comprises a resilient strip extending from edges thereof.

4. The mounting apparatus as described in claim 1, wherein a slot is defined in the head, flange, and parts of the post of the stand off.

5. The mounting apparatus as described in claim 4, wherein the head comprises a diameter reduced guiding portion, a diameter increased holding portion, and a vertex portion therebetween, the fixing apertures engage with the holding portion.

6. The mounting apparatus as described in claim 1, wherein the supporting plate comprises a plurality of raised platforms extending therefrom, the through holes are defined in the platforms, each through hole comprises a circle hole, and a slot extending from the circle hole.

7. The mounting apparatus as described in claim 1, the standoff is made of electronic conductive materials.

8. The mounting apparatus as described in claim 1, wherein the supporting plate further comprises a bulge defining a screw hole, the screw hole cooperates with a through aperture defined in the PCB for engaging with a thumb screw.

9. The mounting apparatus as described in claim 1, wherein the mounting bracket further comprises a connecting portion connecting the mounting portions.

10. A mounting apparatus for securing a PCB in an electronic device comprising a panel, the mounting apparatus comprising:
    a PCB defining a plurality of fixing apertures;
    a supporting plate adapted be installed in the electronic device for supporting the PCB, the supporting plate defining a plurality of through hole, the through hole comprises a circle hole and a slot; and
    a plurality of standoff received in the circle hole and engaging in the slot of the supporting plate, the standoff comprising a head with a holding portion, and a flange supporting the PCB thereon;
    a plurality of ground member attaching to the standoff and comprising a first ring, a second ring, and a band disposed therebetween;
    wherein the first and second rings of the ground member respectively surround the head and the post of the standoff, the combined standoff and the ground member slidably engaging in the through hole, the fixing apertures of the PCB engages with the holding portion of the standoff.

11. The mounting apparatus assembly as described in claim 10, wherein the standoff further comprises a base disposed at outmost end of the standoff, the second ring of the ground member is supported on the base.

12. The mounting apparatus assembly as described in claim 10, wherein the crossing slot is defined in the head, flange and parts of the standoff.

13. The mounting apparatus assembly as described in claim 11, wherein the head comprises a diameter increasing guiding portion, the holding portion joint to the guiding portion and its diameter is reduced.

14. The mounting apparatus assembly as described in claim 10, wherein a plurality resilient strip extends respectively from the first and second rings of the ground member.

15. The mounting apparatus assembly as described in claim 10, wherein the supporting plate further defines a screw hole therein, corresponding to one of the fixing apertures of the PCB for engaging with a thumb screw.

16. The mounting apparatus assembly as described in claim 10, wherein the ground member and the standoff are made of electronic conductive materials.

17. A method for using a mounting apparatus to secure a printed circuit board in a chassis of an electronic device, comprising the steps of:

providing a supporting plate fixedly installed in said chassis;

disposing a plurality of through holes on said supporting plate;

installing a standoff to extend through said each through hole;

engaging one end of said standoff with said printed circuit board at one side of said supporting plate and the other end of said standoff with said chassis at the other side of said supporting plate respectively;

moving said engaged standoff and printed circuit board along an extending direction of said each through hole in said chassis; and fixing said printed circuit board to said supporting plate.

18. The method as described in claim 17, further comprising a step of installing a ground member beside said standoff to electrically engage with said printed circuit board and said chassis respectively.

19. The method as described in claim 17, wherein said standoff comprises a base with a lager profile than any portion of said each through hole to slidably engage with said chassis in said engaging step.

* * * * *